UNITED STATES PATENT OFFICE.

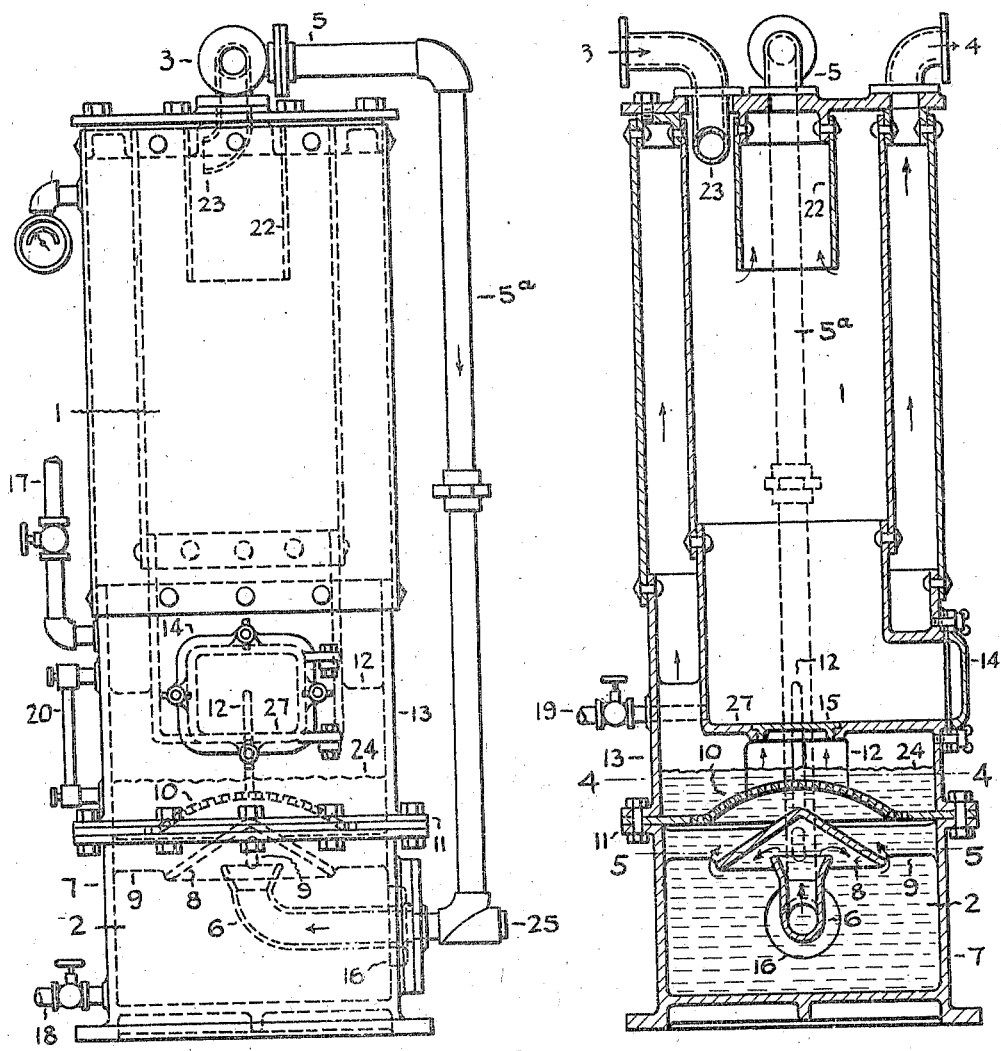

DANIEL HURLEY, OF PROVIDENCE, RHODE ISLAND.

SEPARATOR FOR SUCTION CLEANING APPARATUS.

965,581.  Specification of Letters Patent.  Patented July 26, 1910.

Application filed February 24, 1908. Serial No. 417,347.

*To all whom it may concern:*

Be it known that I, DANIEL HURLEY, of Providence, in the county of Providence and State of Rhode Island, have invented certain new and useful Improvements in Separators for Suction Cleaning Apparatus; and I do hereby declare the following to be a full, clear, and exact description of the invention, such as will enable others skilled in the art to which it appertains to make and use the same.

This invention relates to suction cleaning apparatus having special reference to the separator for collecting the impurities and also for washing and cleaning the impurities-laden air, the separator being located in the passage from the cleaner tool to the pump or other suction producing means adapted for the extraction of dust and dirt from the interiors and contents of buildings, railroad cars and the like.

My object is to provide improvements in those separators in which dry and liquid separating elements are combined in a single structure. Primarily I make provision for readily gaining access to the perforated screen or sieve through which the dust laden air passes. For this purpose I make the casing in two separable parts, bolted together, and secure the perforated screen or plate by the coupling bolts, thus enabling me to readily remove the plate. I also provide effective means for rigidly holding and bracing the perforated plate so that it will withstand the suction action. The plate is preferably of thin brass, and the perforations tend to weaken it and hence the necessity for this reinforcement.

My improvements further contemplate providing a circular baffle plate over the point at which the dust laden air is introduced into the water, this baffle being subjacent the perforated screen and causing the air to spread and distribute itself before passing through the screen.

My separator is characterized by means for permitting the dust laden air to whirl about freely in the dry compartment and take a downward course therein for a short distance before entering a central outlet leading to the liquid separator, and conducting the air from the latter through a passage at one side of the dry compartment.

Figure 4:
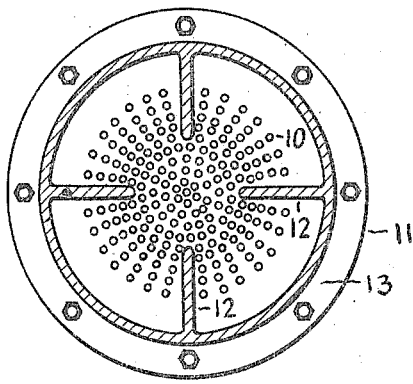
Figure 5:
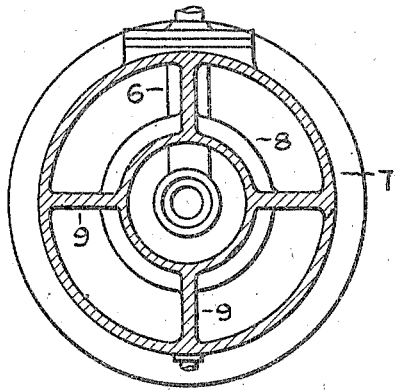
Figure 6:
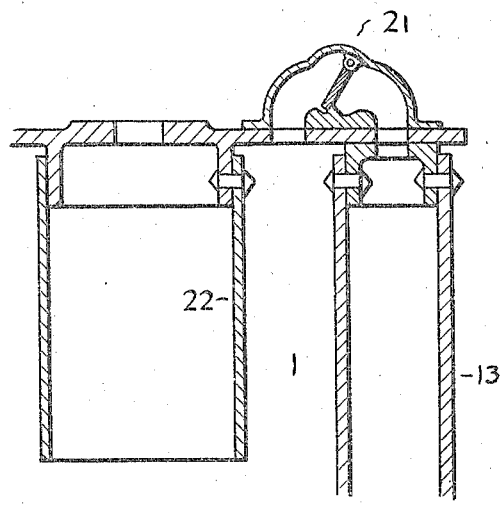

In the accompanying drawing, Figure 1 is a front elevation. Fig. 2 is a vertical section on line 2—2, Fig. 3. Fig. 3 is a plan view. Fig. 4 is a section on line 4—4, Fig. 2, and Fig. 5 is a section on line 5—5, Fig. 2. Fig. 6 is a section on line 6—6, Fig. 3.

Referring to the drawing, 1 represents the dry separator compartment, 2 the liquid separator compartment, 3 the air inlet to compartment 1, and 4 the filtered or washed air outlet leading from compartment 2.

5 represents the outlet from the separating compartment 1 in communication by pipe 5ª with pipe 6 leading to the washing or liquid separating compartment 2.

7 is the casing inclosing the liquid separating parts, and 13 is the upper casing containing the dry separator 1, the space between parts 13 and 1 being open to the liquid and in communication with outlet 4. I have shown casings 13 and 7 formed with flanges 11 and bolted together to permit of ready removal.

I provide the liquid separator with improved means for distributing the air current conducted into the body of water and then filtering the air before it leaves the water. To obtain these purposes I have shown compartment 2 equipped with a baffle plate 8 of substantially conical formation and arranged centrally of the compartment over the outlet end of pipe 6. The plate 8 may be of any preferred shape, size and disposition to insure its spreading and distributing the column of dust laden air as it leaves pipe 6. I have shown this baffle or spreader secured to casing 7 by ribs 9 and, as indicated in Fig. 5, the spreader and ribs may be cast with the casing.

The perforated filter plate or screen is indicated at 10. As shown in Fig. 2 this plate is preferably of concavo-convex shape and arranged above the spreader 8 with the apex of the latter opposite its concaved face. As a simple means of holding the screen 10 and at the same time allowing for ready access thereto, I have shown its edges held between the flanges 11, the bolts passing through the edges of the sieve and the flanges. As the sieve is preferably of thin brass which is to same extent weakened by the perforations and is subjected to a strong suction action it is essential that it be firmly braced. This I accomplish by means of braces 12 which may be cast with casing 13 as indicated in Fig. 4 and extend from the casing to the wall of compartment 1 and beneath the floor 27 thereof to the sieve 10.

I provide for gaining access to the sieve 10 for cleaning it without dismantling the parts. As shown in Fig. 2 the compartment 1 is provided at its lower end with an opening closed by a hinged cover 14. This enables me to readily remove the heavy particles of dirt which fall to the bottom of the compartment. I have shown in Fig. 2 the floor 27 having an opening over the sieve 10 and closed by a cover 15. By this means a brush may be inserted to clean the sieve. When, however, it is desirable to remove the sieve the bolts passed through flanges 11 may be removed and pipe 5ᵃ uncoupled. This allows of casing 13 being removed from casing 7 and releases the sieve. Access to the interior of casing 7 may be had through a hand hole closed by a cover 16.

17 is the water supply pipe and 24 indicates the normal level of the water in the liquid separator 2.

18 is the liquid separator drain.

19 shows a drain from the dry separator which may be used when scrubbing water is collected by the apparatus.

20 is a gage glass which shows the height of the water in the liquid chamber, 25 representing a clean out plug.

21 is a check valve which connects the dry and liquid compartments and thereby provides for equal pressures in the two chambers. (See Fig. 6.)

22 is a cylindrical shell or guide for the air stream entering compartment 1. Being centrally located this cylinder permits the air to whirl about it without obstructing the current. As the air has to descend a short distance before entering this cylinder the heavier particles will fall to floor 27.

23 is the internal end of elbow 3.

The locations of elbows 3 and 4 are such that connections are easily and quickly made to suitable piping supplying impurities-laden air from the cleaner, and carrying filtered air to the suction means. The arrangement of the vertical air entrance 6, baffle plate 8, perforated plate 10 and baffle floor 27, provides effective means for arresting the impurities particles and separating them from the flowing air. As the air passes through the sieve 10 and leaves the liquid, it encounters the floor 27 of the dry compartment in its travel to outlet 4. This flooring thus acts as a baffle and tends to further free the air of dust particles. The check valve 21 insures equality of pressures in compartment 1 and the space between the latter and casing 13.

In operation, the suction means is started and the cleaner tool is applied, the impurities-laden air being conveyed to chamber 1 through the inlet 3 by suitable hose and piping. The air passes to the annular space between the walls of the cylinder 22 and those of compartment 1. A circular motion ensues and the air, moving at a comparatively slow velocity, frees itself of the heavier particles which fall by gravity to the floor 27 of compartment 1. The streams are then directed through the central cylinder 22 and out of the dry separating compartment at 5. After passing through pipe 5ᵃ the air stream enters the liquid compartment 2 through pipe 6 in a vertical direction. This direction of the stream is deflected by the baffle plate 8, thereby allowing the water to partially wash the air stream. The air currents then pass around the edges of baffle plate 8 being thus divided and distributed, and through the finely perforated plate 10, where the impurities-carrying air bubbles which have passed through the water are disintegrated, and the dirt taken up by the water. The air streams now passing through the plate 10 and toward the outlet 4, are deflected again in their paths by the floor 27 of compartment 1, which acts as a baffle plate giving the air a tortuous passage. The air then passes through the annular space between the cylindrical walls 1 and 13, and out through outlet 4 to the suction producing means.

Practice has demonstrated the necessity for readily gaining access to the interior of the separators for the purpose of cleaning the parts, especially the perforated plates. It has also shown that unless means be employed for distributing the current of dust laden air the separating elements will become clogged owing to the quantity of dirt which a single jet of air will cause to gather at one point. Furthermore, while the dust laden air should be given a whirling action and downward direction in the dry separator, yet the outlet therefrom should be away from this circular path to avoid the air being drawn directly into it without losing any of the dirt particles entrained with it. It will be obvious to those skilled in the art that by my invention these essentials are fully provided for.

I claim as my invention:—

1. In a separator for suction cleaning apparatus, a two part casing, means for coupling said parts, said casing comprising a dry compartment and a liquid compartment, a pipe leading from said dry compartment to said liquid compartment and terminating beneath the liquid level thereof, and a perforated plate above the extremity of said pipe, said plate being secured by said coupling means.

2. In a separator for suction cleaning apparatus, a casing comprising two compartments, one a dry separator and the other a circumposed liquid separator, an annular space being formed between said compartments, a pipe connecting said separators and terminating below the liquid, the travel of the dust-laden air being from said dry separator to said liquid separator, a solid baffle plate extending over and around the outlet from said pipe, a perforated plate in rear of said baffle plate below the liquid level and an outlet pipe leading from the space between said compartments.

3. In a separator for suction cleaning apparatus, a casing adapted to contain water to constitute a liquid separator, a dry separator within said casing above the water level, an annular space open to the water being provided between the walls of said dry separator and said casing, an outlet pipe leading from said space, a pipe leading from said dry separator to said liquid separator and terminating below the surface of the liquid therein, and a perforated plate secured to said casing and immersed in the liquid above the termination of said pipe and extending entirely across said casing.

4. In a separator for suction cleaning apparatus, a two part casing comprising a dry separator and a subjacent liquid separator, means for coupling said casing parts, means for conducting air from said dry separator to said liquid separator and discharging it beneath the liquid level therein, a perforated plate arranged transversely of the path of the air discharging into said liquid separator, means for supporting said plate, and ribs or braces secured to said dry separator and to said plate.

5. In a separator for suction cleaning apparatus, the combination with the two part casing and means for coupling said parts, said casing containing a dry separator having a cylindrical outlet depending from its top and means for introducing air between said cylindrical outlet and the wall of the separator, of a liquid separator formed by said casing beneath said dry separator, a pipe leading from said dry separator into said liquid separator and having a vertical extremity discharging below the liquid level, a solid baffle plate supported by the walls of the casing and disposed across and above the outlet from said pipe, a perforated plate disposed transversely of the liquid compartment above said baffle plate and having its ends supported by said coupling means, and an outlet from said liquid separator.

6. In a separator for suction cleaning apparatus, the combination with the liquid compartment having a solid conical spreader transversely arranged therein, an air pipe having a vertical outlet discharging below the center of said spreader, and a perforated plate above said spreader, of a dry compartment above the liquid compartment, the floor of said dry compartment extending across said plate to act as a baffle and a tubular connection between said compartments.

In testimony whereof, I have signed this specification in the presence of two subscribing witnesses.

DANIEL HURLEY.

Witnesses:
RICHARD A. HURLEY,
ARTHUR J. CLARK.